United States Patent [19]
Martin et al.

[11] Patent Number: 5,753,596
[45] Date of Patent: May 19, 1998

[54] METHODS AND EMULSIONS FOR INHIBITION OF OIL WELL CORROSION

[75] Inventors: Richard L. Martin; John P. Mullen; Peter E. Brown; Thomas G. Braga, all of St. Louis, Mo.

[73] Assignee: Baker Hughes Incorporated, Houston, Tex.

[21] Appl. No.: 556,181

[22] Filed: Nov. 9, 1995

[51] Int. Cl.$^6$ .................................................. C09K 3/00
[52] U.S. Cl. ........................ 507/237; 507/238; 507/939
[58] Field of Search ........................... 507/939, 237, 507/238, 128

[56] References Cited

U.S. PATENT DOCUMENTS

| | | | |
|---|---|---|---|
| 3,105,050 | 9/1963 | Fischer | 252/76 |
| 3,343,599 | 9/1967 | Eddins, Jr. et al. | 166/21 |
| 3,347,789 | 10/1967 | Dickson et al. | 252/8.55 |
| 3,490,237 | 1/1970 | Lissant | 60/217 |
| 3,523,826 | 8/1970 | Lissant | 134/22 |
| 3,539,406 | 11/1970 | Lissant | 149/109 |
| 3,565,817 | 2/1971 | Lissant | 252/312 |
| 3,617,095 | 11/1971 | Lissant | 302/66 |
| 3,684,251 | 8/1972 | Bowling | 259/8 |
| 3,700,594 | 10/1972 | Lissant | 252/8.55 |
| 3,712,862 | 1/1973 | Bundrant et al. | 252/8.55 |
| 3,712,863 | 1/1973 | Bundrant et al. | 252/8.55 |
| 3,732,166 | 5/1973 | Lissant | 166/304 |
| 3,909,447 | 9/1975 | Redmore et al. | 252/389 A |
| 3,959,177 | 5/1976 | Martin | 252/389 A |
| 4,018,426 | 4/1977 | Mertz et al. | 259/7 |
| 4,075,291 | 2/1978 | Redmore et al. | 260/933 |
| 4,339,349 | 7/1982 | Martin et al. | 252/389 A |
| 4,722,805 | 2/1988 | Martin | 252/389.21 |
| 5,027,901 | 7/1991 | French et al. | 166/310 |

FOREIGN PATENT DOCUMENTS

| | | | |
|---|---|---|---|
| 1132908 | 10/1982 | Canada . | |
| 0 279 499 | 12/1991 | European Pat. Off. | A23D 7/00 |
| 0 279 498 | 6/1994 | European Pat. Off. | A23D 7/00 |
| 2 194 166 | 3/1988 | United Kingdom | B01F 7/26 |

*Primary Examiner*—Philip Tucker
*Attorney, Agent, or Firm*—Howell & Haferkamp, L.C.

[57] ABSTRACT

A novel method for inhibiting oxygen corrosion in an oil well, and an emulsion useful therein. The method comprises introducing into the well a pourable emulsion comprising about 50 to about 95 volume percent discontinuous aqueous phase, about 5 to about 50 volume percent continuous oil phase, and a corrosion inhibiting amount of a composition comprising a corrosion inhibitor selected from among thiophosphates containing both oxygen and sulfur, pyrophosphates containing both oxygen and sulfur and mixtures thereof.

27 Claims, No Drawings

METHODS AND EMULSIONS FOR INHIBITION OF OIL WELL CORROSION

BACKGROUND OF THE INVENTION

1. Field of the Invention

The present invention relates to corrosion and hydrogen embrittlement in oil wells, and more particularly inhibition of such corrosion and embrittlement by the application of certain types of emulsions to the oil well.

2. Description of the Prior Art

U.S. Pat. No. 5,027,901 to French et al., incorporated herein by reference, describes certain corrosion problems encountered in oil wells and is directed to the inhibition of such corrosion by introducing to the annulus of the oil well certain pourable emulsions that contain a corrosion inhibitor. The emulsions prepared in accordance with that patent control oil well corrosion in a great number of wells for longer times following batch applications than do conventional corrosion inhibitor solutions.

However, sufficient corrosion control and equipment life have not been attained by the methods of the noted '901 patent in oil wells that become contaminated with oxygen or which are sucker rod produced and so have rods that are subjected to high alternating stresses. This latter problem is exacerbated by a process that may be described as hydrogen embrittlement. Hydrogen embrittlement occurs when the metal, typically steel, is exposed to hydrogen. Hydrogen or hydrogen-containing species often occur naturally in the well fluids that contain the metal equipment in the well. Hydrogen also is produced as a by-product of the primary corrosion reaction. The hydrogen diffuses into the metal, thereby weakening the metal and leading to early fracturing of the metal. Thus, an improved technique for providing oxygen corrosion control as well as inhibiting hydrogen embrittlement (such as by reducing the hydrogen level contact with the metal) is needed.

Hydrogen embrittlement, a type of stress corrosion cracking, is discussed in U.S. Pat. No. 3,959,177 to Martin, which is incorporated herein by reference. The corrosion inhibitors of this '177 patent are directed to inhibition of such stress corrosion cracking, but the patent includes no teaching or suggestion of inclusion of them in an emulsion.

SUMMARY OF THE INVENTION

The present invention, therefore, is directed to a novel method for inhibiting oxygen corrosion in an oil well. According to the method, a pourable emulsion comprising about 50 to about 95 volume percent discontinuous aqueous phase, about 5 to about 50 volume percent continuous oil phase, and a thiophosphate containing both oxygen and sulfur, a pyrophosphate containing both oxygen and sulfur or a mixture thereof, is introduced into the well.

The present invention is also directed to a novel pourable emulsion comprising about 50 to about 95 volume percent discontinuous aqueous phase, about 5 to about 50 volume percent continuous oil phase, and a thiophosphate containing both oxygen and sulfur, a pyrophosphate containing both oxygen and sulfur or a mixture thereof.

Among the several advantages of this invention, may be noted the provision of a method for improved oxygen corrosion inhibition in oil wells; the provision of such method that further inhibits hydrogen embrittlement; and the provision of a composition useful in such method.

DETAILED DESCRIPTION OF THE PREFERRED EMBODIMENTS

In accordance with the present invention, it has been discovered that by incorporating thiophosphates containing both oxygen and sulfur, pyrophosphates containing both oxygen and sulfur or mixtures thereof into an emulsion as described in U.S. Pat. No. 5,027,901, a surprisingly effective, surprisingly long-lasting oxygen corrosion inhibitor for oil wells is produced. Moreover, it has also been found that by further incorporating 1,2-dithiole-3-thiones or quaternaries thereof into the emulsion in addition to the noted phosphates, the emulsion provides surprisingly effective and surprisingly long-lasting inhibition of hydrogen embrittlement.

Introduction of the emulsions of this invention into the annulus of an oil well, therefore, has been found to reduce stress corrosion cracking and to extend the life of sucker rods and other equipment in the well to a surprising degree. In fact, although these additives are disclosed in U.S. Pat. No. 3,959,177 as being effective against corrosion of the cracking type, their efficacy and life is increased to a surprising degree upon incorporation into an emulsion of the type disclosed in U.S. Pat. No. 5,027,901. And results of tests using linear polarization to measure corrosion rates, POTENTIODYNE®[1] polarization to measure oxygen contamination and hydrogen entry measurements which have been found to correlate with corrosion fatigue properties have shown that the tested emulsions of this invention gave improved performance against oxygen contamination oil well corrosion and lowered the amount of hydrogen entering oil well steel significantly, while maintaining the longer treatment life expected with emulsions of this type.

[1]Cortest Instruments

The emulsions of the invention have a discontinuous aqueous phase and a continuous oil phase. The terms "discontinuous" and "continuous" are used in their ordinary sense in emulsion chemistry and the terms "internal phase" and "external phase", may be considered synonyms, respectively, of "discontinuous phase" and "continuous phase".

The term "aqueous phase" is used in its more colloquial sense of a phase which is not soluble in the oil phase. That is, "aqueous phase" is not intended to mean literally only water. For instance, highly polar fluids such as alcohols or alcohol-water mixtures would be suitable. However, the relative cost of such fluids other than water dictate that in all but the most unusual applications, the aqueous phase will be water. While highly purified water such as distilled or deionized water is quite usable, ordinary tap water is less expensive and offers no significant disadvantages.

Water such as municipal waste treatment plant discharge water is also usable and in some locations may be obtained at no cost. Further, river water may be used with minimal or no purification. Of particular note is the fact that water produced from oil wells (which may contain some oil) may be used. This source of water is advantageous because it may be obtained at the well site (avoiding the cost of transporting the water) and because disposal of such water is often a problem due to its salt or residual oil content (this use reduces the volume to be disposed).

The aqueous phase may contain various auxiliary ingredients such as water soluble corrosion inhibitors, scale inhibitors, and biocides. Salts such as sodium chloride or calcium chloride, can be added to increase the specific gravity of the emulsion. Various alcohols or salts may be added to depress the freezing point of the aqueous phase if they are to be transported or stored in cold weather.

The term "oil phase" is also used in its more colloquial sense and is intended to mean a relatively non-polar substance which is not soluble in the aqueous phase. Thus, materials such as petroleum distillates (e.g., kerosene, gasoline, naphtha, and most aliphatic solvents, etc.), food oils, and mineral oils may be used. The low cost and easy availability of kerosene make it an ideal choice for the oil phase.

The oil phase contains a corrosion inhibiting amount of an oil soluble corrosion inhibiting compound in addition to the noted phosphate corrosion inhibitor and, optionally, the noted thiones or quaternaries thereof. By "corrosion inhibiting amount" is meant an amount which, when incorporated into the emulsion, will permit measurable corrosion inhibition when introduced into an oil well. By "oil soluble" is meant that the compound is soluble in the oil phase (the oil phase may contain co-solvents to assist in the solubility of the compound in the oil phase). By "corrosion inhibiting compound" is meant a compound or mixture of compounds which can prevent corrosion in an oil well.

Such oil soluble corrosion inhibiting compounds include those typically added to wells in conventional treating processes. These materials are well known to those skilled in the art and include carboxylic acids and derivatives such as aliphatic fatty acid derivatives, imidazolines and derivatives (including amides), quaternary ammonium salts, rosin derivatives, amines, pyridine compounds, trithione compounds, heterocyclic sulfur compounds, quinoline compounds, or salts, quats, or polymers of any of these, etc. Examples of suitable inhibitors include primary, secondary, and tertiary monoamines; diamines; amides; polyethoxylated amines, diamines or amides; salts of such materials; and amphoteric compounds. Other examples include imidazolines having both straight and branched alkyl chains. A specific example is

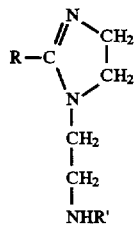

wherein R is the residue of a fatty acid and R' is a fatty acyl group or H.

Quaternary ammonium compounds often are used in mixtures, for instance, dicocodimethyl quaternary ammonium chlorides mixed with soya or tallow trimethyl quaternaries. Rosin derivatives are typically abietic acid derivatives such as palustric acid, neoabietic acid, dehydroabietic acid, dihydroabietic acid, tetrahydroabietic acid, levopimaric acid, dextropimaric acid, and isodextropimaric acid. Of particular interest are those compounds such as imidazolines and amides, which in addition to their action as corrosion inhibitors act as emulsification agents. These compounds eliminate the need for a separate emulsification agent and thereby reduce the chance of manufacturing errors and lower the cost of the product. Particularly preferred corrosion inhibiting compounds are the reaction products of fatty acids (such as tall oil acid) and polyamines (such as diethylenetriamine).

Many of these corrosion inhibiting compounds of this invention have been found to act as emulsification agents, but for species that do not so act, a separate emulsification compound is required. Such materials are well known in the art and include ionic and non-ionic emulsifiers. Particularly preferred species include alkoxylated amines, glycols, or alcohols, as well as substituted phenols. The emulsification compound is added in sufficient quantity to provide a relatively stable, non-separating emulsion.

The phosphate corrosion inhibitor in the oil phase is a thiophosphate containing oxygen and sulfur, a pyrophosphate containing both oxygen and sulfur or a mixture thereof. It has been found that superior inhibition of oxygen corrosion is provided by emulsions of this invention that contain such inhibitors. In addition, the emulsion may contain 1,2-dithiole-3-thiones or a quaternary thereof as a hydrogen embrittlement inhibitor. It has been found that such thiones and quaternaries thereof impart to the emulsion superior "cracking" corrosion inhibition.

As noted, the thiophosphates containing both oxygen and sulfur, pyrophosphates containing both oxygen and sulfur and mixtures thereof, as well as the 1,2-dithiole-3-thiones and quaternaries thereof, as employed in this invention are those described in U.S. Pat. No. 3,959,177. See, for example, column 6, line 47 to column 8, line 68, column 11, lines 3–57 and the working examples of U.S. Pat. No. 3,959,177, noting, however, that film-forming type inhibitors are not required by the subject invention. It is believed that the preferred embodiments of the phosphates and thiones as set forth in U.S. Pat. No. 3,959,177 are likewise the preferred embodiments in the subject invention. Such phosphates are described also in U.S. Pat. Nos. 4,075,291 and 3,909,447, as well as in U.S. Pat. Nos. 4,339,349 and 4,722,805, all of which are incorporated herein by reference. The full breadth of oxygen- and sulfur-containing phosphates as described by the noted patents are believed to be suitable herein.

In short, the phosphates of this invention contain oxygen and sulfur and are of Type A as designated in the '177 patent. Type A phosphates may be derived from $P_2S_5$, such as by reaction with various alcohols to form thiophosphates and pyrophosphates.

The thiones of this invention also contain oxygen and sulfur and may be represented by the formula

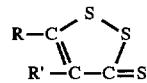

wherein R and R' are substituted groups such as alkyl, aryl, cycloalkyl, alkenyl, alkynyl, alkaryl, aralkyl, heterocyclic, and so forth. Further, one of R and R' may be hydrogen. Methods for preparation as well as preferred embodiments of such thiones and quaternaries thereof are discussed beginning in the '177 patent at column 11, line 3 and in the reference cited therein.

The permissible range of ratios of phosphate to thione is believed to be as discussed in U.S. Pat. No. 3,959,177, although in this case, it is necessary that some corrosion-inhibitive amount of the phosphate be present. Optimally, the molar ratio is about 1:1, although 1:2 to 2:1, or even 1:5 to 5:1, are within the preferred range when thione is included.

The products of the invention are water-in-oil emulsions. The term "emulsion" is used in its classic sense to mean a stable, non-separating dispersion.

The dispersions of the invention may be of the high internal phase ratio emulsion (HIPRE) type or of the near-HIPRE type. HIPRE emulsions are those wherein the internal phase exceeds the packing density possible for spheroidal droplets, and thus have in excess of about 75 volume percent internal phase. Near-HIPRE emulsions are those having at least about 50 volume percent internal phase, but which are not true HIPREs. There is not a sharp distinction between the properties of HIPREs and near-HIPREs. Rather, there is a gradual change as the ratio of the phases is altered.

The emulsions of the invention are pourable. By pourable is meant that if they are put in the annulus of a well, without subjecting them to shear, they will be sufficiently non-viscous that they will fall to the collected borehole fluids at the bottom of the well (this may be some 1,000 to 2,000 meters below the surface). The near-HIPREs are invariably pourable unless a thickening agent is added. The HIPREs become unpourable as the internal phase approaches 95 volume percent, depending, inter alia, on the separate viscosities of the continuous and discontinuous phases. Generally, the internal phase of the emulsion should not exceed 90, preferably 80, and more preferably 70 volume percent of the emulsion.

The near-HIPREs can be made by techniques known for many years to those skilled in the art. HIPREs can be made by newer, but still well known techniques. Techniques useful for making HIPREs can also be used to make near-HIPREs. Relevant information concerning suitable aqueous phase and oil-phase materials, emulsification compounds, and emulsification techniques and equipment can be found in the following literature, as well as the reference cited therein (all of which is hereby incorporated by reference):

| Country | U.S. Pat. No. | Inventor | Assignee |
|---|---|---|---|
| Canada | 1,132,908 | Aronson | Unilever |
| Europe | 0,279,498 | Cain | Unilever |
| Europe | 0,279,499 | Cain | Unilever |
| British | 2,194,166 | Bradley | Petrolite |
| United States | 3,343,599 | Eddins | Petrolite |
| United States | 3,523,826 | Lissant | Petrolite |
| United States | 3,539,406 | Lissant | Petrolite |
| United States | 3,565,817 | Lissant | Petrolite |
| United States | 3,684,251 | Bowling | United States |
| United States | 3,700,594 | Lissant | Petrolite |
| United States | 3,732,166 | Lissant | Petrolite |
| United States | 4,018,426 | Mertz | Petrolite |

Attention is particularly called to the list of references in the aforementioned CA 1,132,908.

The method of the invention is carried out by introducing the emulsion to an oil well, preferably through the annulus. A flush (i.e., subsequent introduction of another fluid, such as water) is generally not necessary, but can be used.

The collected borehole fluids in the annulus of the well generally comprise a predominately crude oil layer floating on top of a predominately water layer. Although not directly observed, the emulsion of the invention is thought to usually become situated primarily at the interface of the crude oil and water layers since its density is usually between that of crude oil and water. However, if it is desired to place the emulsion at the extreme bottom of the well (for instance, to place inhibitors below the pump), the emulsion can be easily weighted by adding a density increasing substance such as a salt to the aqueous phase.

The emulsions of the invention are used in an effective amount. By "effective amount" is meant an amount sufficient to reduce corrosion in an oil well. Although well conditions, production rate, treatment intervals, emulsion stability, choice of corrosion inhibiting compound, concentration of corrosion inhibiting compound in the oil phase, and concentration of oil phase in the emulsion, all have an effect on the required quantity of emulsion, generally about 1 to 10,000, desirably 4 to 1,000, and preferably 8 to 500 liters per treatment is used. Alternatively, generally about 1 to 500, desirably 2 to 100, and preferably 5 to 20 parts of emulsion per part of produced fluid are used.

The emulsions of the invention can be prepared at a central site and transported to the wells, or in a preferred embodiment, they can be prepared using equipment stored or mounted on a vehicle which is also used to deliver the emulsion to the well site. If the emulsions are made in relatively small quantities, it will be particularly convenient to formulate the emulsion introduced to a well to the particular needs of that well. Thus, a treatment driver could separately blend the emulsion for each well based on data relating to the corrosion problems unique to each well. This results in both costs savings by avoiding unnecessary use of chemicals and cost savings by ensuring adequate protection of well equipment. The inhibitors may be introduced by simple blending into the emulsion and may be metered by a slip-stream into the pipeline through which the emulsion is delivered to the well.

Although the emulsions of the invention are "stable", the degree of stability is dependent on several factors such as oil well temperature, the nature and quantity of emulsifiers, the ratio of the phases, and method of preparation. By using large quantities of extremely stable emulsions it may be possible to extend treatment intervals to exceedingly long intervals. For instance, it may be possible to completely fill the annulus with emulsion and have a treatment life of perhaps a year or more.

The invention will be further described in the following example. In the example, all parts and percentages of aqueous and oil phases are by volume. All other parts and percentages are by weight unless otherwise specified.

PREPARATION OF EMULSIONS

The emulsions of the invention used in the example were prepared by the following general method.

1. The oil phase (kerosene) and the corrosion inhibiting compound were premixed without a separate surfactant or emulsifier to form a base stock.
2. The base stock was pumped at a metered rate to an emulsion storage tank, from which it was recirculated through a pump, a static mixer, and back to the emulsion storage tank.
3. While maintaining circulation of the base stock, water was pumped at a metered rate to the static mixer and an emulsion was formed.
4. With the base stock and water feeds adjusted to produce the appropriate ratio of internal phase to external phase, emulsion was withdrawn from the recirculating loop and put into containers for transportation to a well site.

The following example describes preferred embodiments of the invention. Other embodiments within the scope of the claims herein will be apparent to one skilled in the art from consideration of the specification or practice of the invention as disclosed herein. It is intended that the specification, together with the example, be considered exemplary only, with the scope and spirit of the invention being indicated by the claims which follow the example. In the example, all percentages are given on a volume basis unless otherwise indicated.

EXAMPLE 1

Two quantities of emulsions (4 gal. each) containing 60% aqueous phase, which included 4% (based on total emulsion weight) quaternary ammonium compound and 3% (based on total emulsion weight) phosphonate scale inhibitor, and 40% kerosene phase, which contained 20% (based on total emulsion weight) dimer/monomer acid salt of an imidazoline were prepared according to the method described above as base emulsions. One pint of thiophosphate and one pint trithione were mixed thoroughly into one of the quantities of emulsion with a blending mixer. For the other quantity of emulsion, the same additives in the same ratios were poured simultaneously into the treating pipe of an oil well. The quantities of emulsion showed equal efficacy, thus demonstrating that the inhibitive additive may be incorporated into the emulsion by a slip-stream rather than by pre-mixing, thereby simplifying the well treatment operation, particularly for those wells requiring the additive package that are adjacent wells that can be treated effectively with the standard emulsion. In particular, the quantities of the emulsion were used for treatment of two wells. Well 1 was 3850 feet deep and produced per day 902 barrels of oil plus salt water containing 45 ppm hydrogen sulfide. It exhibited an electrochemically measured oxygen influence of 0.5 ppm. It was treated once a week. Well 2 was 2500 feet deep and produced per day 1410 barrels of oil plus salt water containing 50 ppm hydrogen sulfide. The sucker rods were in a stress condition sufficiently high to require treatment with a hydrogen entry inhibitor. It was treated twice a week. Well 1 was treated previously with an imidazoline corrosion inhibitor. Well 2 was treated previously with a conventional hydrogen entry inhibitor. The results were as follows, wherein "mpy" is the mils per year corrosion rate measured by linear polarization and "H-entry" is the hydrogen entry in micro-amps measured by flowline patch probe:

|  | Well 1 | Well 2 | |
|---|---|---|---|
|  | mpy | mpy | H-entry |
| No inhibitor | 10 | 3 | NA |
| 1 day after addition of imidazoline inhibitor | 2 |  |  |
| 6 days after addition of imidazoline inhibitor | 3 |  |  |
| 3 days after addition of conventional H-entry inhibitor |  | 0.1 | 5.5 |
| 2 days after addition of blended emulsion/inhibitor of invention | 1 | 0.3 | 2.8 |
| 7 days after addition of blended emulsion/inhibitor of invention | 0.7 | 0.2 | 2.0 |
| 9 days after addition of blended emulsion/inhibitor of invention | 0.8 | 0.2 |  |
| 12 days after additional of blended emulsion/inhibitor of invention |  | 0.7 |  |

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A method for inhibiting oxygen corrosion in an oil well, comprising introducing into the well a pourable emulsion comprising (i) about 50 to about 95 volume percent discontinuous aqueous phase, about 5 to about 50 volume percent continuous oil phase, and (ii) a corrosion inhibiting amount of a composition comprising a corrosion inhibitor selected from the group consisting of thiophosphates containing both oxygen and sulfur, pyrophosphates containing both oxygen and sulfur and mixtures thereof.

2. A method as set forth in claim 1 wherein the emulsion further comprises a corrosion inhibiting amount of an oil soluble, corrosion inhibitive agent selected from the group consisting of amides, imidazolines, carboxylic acids, amines, pyridine compounds, heterocyclic sulfur compounds, and salts, quats, and polymers of any of such agents.

3. A method as set forth in claim 2 wherein the emulsion comprises about 50 to about 92 volume percent of the discontinuous aqueous phase, about 8 to about 50 volume percent of the continuous oil phase and about 3 to about 15 volume percent of the composition.

4. A method as set forth in claim 3 wherein the emulsion comprises from about 1.5 to about 7.5 volume percent of the corrosion inhibitor.

5. A method as set forth in claim 2 wherein the composition further comprises a hydrogen embrittlement inhibitor selected from the group consisting of 1,2-dithiole-3-thiones and quaternaries thereof.

6. A method as set forth in claim 3 wherein the composition further comprises a hydrogen embrittlement inhibitor selected from the group consisting of 1,2-dithiole-3-thiones and quaternaries thereof.

7. A method as set forth in claim 4 wherein the composition further comprises a hydrogen embrittlement inhibitor selected from the group consisting of 1,2-dithiole-3-thiones and quaternaries thereof.

8. A method as set forth in claim 5 wherein the composition consists essentially of the corrosion inhibitor and the hydrogen embrittlement inhibitor.

9. A method as set forth in claim 6 wherein the composition consists essentially of the corrosion inhibitor and the hydrogen embrittlement inhibitor.

10. A method as set forth in claim 7 wherein the composition consists essentially of the corrosion inhibitor and the hydrogen embrittlement inhibitor.

11. A method as set forth in claim 8 wherein the composition consists essentially of the corrosion inhibitor and the hydrogen embrittlement inhibitor in a volume-to-volume ratio of about 1:1.

12. A method as set forth in claim 9 wherein the composition consists essentially of the corrosion inhibitor and the hydrogen embrittlement inhibitor in a volume-to-volume ratio of about 1:1.

13. A method as set forth in claim 10 wherein the composition consists essentially of the corrosion inhibitor and the hydrogen embrittlement inhibitor in a volume-to-volume ratio of about 1:1.

14. A method as set forth in claim 5 wherein the composition inhibits oxygen corrosion and hydrogen embrittlement in the oil well.

15. A pourable emulsion comprising about 50 to about 95 volume percent discontinuous aqueous phase, about 5 to about 50 volume percent continuous oil phase, and a corrosion inhibiting amount of a composition comprising a corrosion inhibitor selected from the group consisting of thiophosphates containing both oxygen and sulfur, pyrophosphates containing both oxygen and sulfur and mixtures thereof.

16. A pourable emulsion as set forth in claim 15 wherein the emulsion further comprises a corrosion inhibiting amount of an oil soluble, corrosion inhibitive agent selected from the group consisting of amides, imidazolines, carboxylic acids, amines, pyridine compounds, heterocyclic sulfur compounds, and salts, quats, and polymers of any of such agents.

17. A pourable emulsion as set forth in claim 16 wherein the emulsion comprises about 50 to about 92 volume percent of the discontinuous aqueous phase, about 8 to about 50 volume percent of the continuous oil phase and about 3 to about 15 volume percent of the composition.

18. A pourable emulsion as set forth in claim 17 wherein the emulsion comprises from about 1.5 to about 7.5 volume percent of the corrosion inhibitor.

19. A pourable emulsion as set forth in claim 16 wherein the composition further comprises a hydrogen embrittlement inhibitor selected from the group consisting of 1,2-dithiole-3-thiones and quaternaries thereof.

20. A pourable emulsion as set forth in claim 17 wherein the composition further comprises a hydrogen embrittlement inhibitor selected from the group consisting of 1,2-dithiole-3-thiones and quaternaries thereof.

21. A pourable emulsion as set forth in claim 18 wherein the composition further comprises a hydrogen embrittlement inhibitor selected from the group consisting of 1,2-dithiole-3-thiones and quaternaries thereof.

22. A pourable emulsion as set forth in claim 19 wherein the composition consists essentially of the corrosion inhibitor and the hydrogen embrittlement inhibitor.

23. A pourable emulsion as set forth in claim 20 wherein the composition consists essentially of the corrosion inhibitor and the hydrogen embrittlement inhibitor.

24. A pourable emulsion as set forth in claim 21 wherein the composition consists essentially of the corrosion inhibitor and the hydrogen embrittlement inhibitor.

25. A pourable emulsion as set forth in claim 22 wherein the composition consists essentially of the corrosion inhibitor and the hydrogen embrittlement inhibitor in a volume-to-volume ratio of about 1:1.

26. A pourable emulsion as set forth in claim 23 wherein the composition consists essentially of the corrosion inhibitor and the hydrogen embrittlement inhibitor in a volume-to-volume ratio of about 1:1.

27. A pourable emulsion as set forth in claim 24 wherein the composition consists essentially of the corrosion inhibitor and the hydrogen embrittlement inhibitor in a volume-to-volume ratio of about 1:1.

* * * * *